O. W. TAFT.
Handle for Cutlery.
No. 160,969. Patented March 16, 1875.
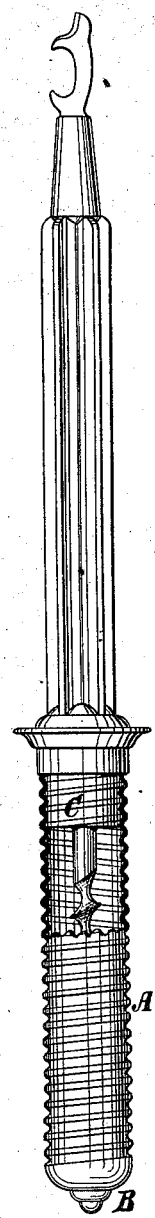
WITNESSES:
INVENTOR:
O. W. Taft
BY
ATTORNEYS.

UNITED STATES PATENT OFFICE.

OWEN W. TAFT, OF NEW YORK, N. Y.

IMPROVEMENT IN HANDLES FOR CUTLERY.

Specification forming part of Letters Patent No. 160,969, dated March 16, 1875; application filed January 25, 1875.

CASE B.

*To all whom it may concern:*

Be it known that I, OWEN W. TAFT, of the city, county, and State of New York, have invented a new and Improved Handle for Cutlery, &c., of which the following is a specification:

My improved handle for cutlery, &c., consists of a tube of sheet metal closed at one end, and attached at the other end to the long bolster or other appropriate part of the article, for which it is to serve as a handle, the said tube being corrugated or fluted for stiffening the metal, so as to use thin, cheap material, and for ornamenting the handle, and the corrugations arranged spirally about the handle, for the purpose of forming a screw-thread, whereby the article to be attached may be screwed in and securely held.

The drawing is a side elevation of a handle constructed according to my invention, with a part represented in longitudinal section.

A represents a tube of thin sheet metal, of suitable size and length for a handle, closed at the end B, open at the other end, which is attached to the bolster C, and corrugated with spiral grooves for stiffening and ornamenting the metal, and forming screw-threads, whereby the handle is attached to the bolster, which is correspondingly screw-threaded.

By making the handle of a sheet-metal tube I get the required size and shape and strength in a simpler and cheaper form than in any other in which the handle can at the present time be constructed; and by corrugating the metal, as described, I make it acceptable so far as style is concerned, and at the same time so stiffen the metal that much lighter and cheaper metal may be used than would answer without the corrugations; and, furthermore, by making the corrugations of a spiral character, I add to the other advantages of the knife by affording a means for securing the handle to the article to be held.

Having thus described my invention, I claim as new and desire to secure by Letters Patent—

As an improved article of manufacture, a handle for cutlery or other articles, made of a sheet-metal tube closed at one end, and stiffened and ornamented by flutes or corrugations arranged spirally about the handle, so as to form screw-threads, substantially as and for the purpose described.

OWEN W. TAFT.

Witnesses:
T. B. MOSHER,
ALEX. F. ROBERTS.